United States Patent
Varnham et al.

(10) Patent No.: US 6,195,162 B1
(45) Date of Patent: *Feb. 27, 2001

(54) SEISMIC SENSOR WITH INTERFEROMETRIC SENSING APPARATUS

(75) Inventors: Malcolm Paul Varnham; Erhard Lothar Edgar Kluth, both of Alresford (GB); Phillip Sam Bull, Houston; John Luscombe, Sugarland, both of TX (US)

(73) Assignee: Geosensor Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/169,252

(22) Filed: Oct. 9, 1998

(30) Foreign Application Priority Data

Oct. 9, 1997 (GB) .................................................... 9721473

(51) Int. Cl.⁷ ....................................................... G01B 9/02

(52) U.S. Cl. ...................... 356/345; 356/480; 250/227.19

(58) Field of Search ................................... 356/345, 350, 356/352, 478, 480, 519; 250/227.19, 227.27; 385/12, 14

(56) References Cited

U.S. PATENT DOCUMENTS

| | | | |
|---|---|---|---|
| 3,903,497 | 9/1975 | Stimler et al. | 340/2 |
| 4,068,952 | 1/1978 | Erbert et al. | 356/5 |
| 4,489,602 | 12/1984 | Henning | 73/327 |
| 4,848,906 | 7/1989 | Layton | 356/345 |
| 4,889,986 | 12/1989 | Kersey et al. | 250/227 |
| 5,173,743 | 12/1992 | Kim | 356/345 |
| 5,191,458 | 3/1993 | Lyons et al. | 359/127 |
| 5,245,407 | * 9/1993 | Nishiura et al. | 356/350 |
| 5,680,489 | 10/1997 | Kersey | 385/12 |
| 5,721,615 | * 2/1998 | McBride et al. | 356/345 |
| 5,754,293 | 5/1998 | Farhadiroushan | 356/345 |
| 5,909,273 | * 6/1999 | Malvern | 356/345 |

FOREIGN PATENT DOCUMENTS

| | | |
|---|---|---|
| 0054363 | 6/1982 | (EP) . |
| 2268581 | 1/1994 | (GB) . |
| 2145237 | 3/1994 | (GB) . |
| 2310280 | 8/1997 | (GB) . |
| 2311131 | 9/1997 | (GB) . |

* cited by examiner

Primary Examiner—Samuel A. Turner
(74) Attorney, Agent, or Firm—Felsman, Bradley, Vaden, Gunter & Dillon, LLP (57) ABSTRACT

An interferometric sensor includes a broadband optical source, a depolarizer for depolarizing optical radiation emitted by the broadband optical source, a matched interferometer, a sensing interferometer, and a detector. The matched interferometer contains a phase modulator. The sensor is configured so that the optical path length difference in the sensing interferometer is approximately equal to the optical path length difference in the matched interferometer.

36 Claims, 7 Drawing Sheets

SEISMIC SENSOR WITH INTERFEROMETRIC SENSING APPARATUS

FIELD OF THE INVENTION

This invention relates to interferometric sensing apparatus. In particular it relates to the configuration particularly suited to the simultaneous interrogation of a large number of hydrophones.

BACKGROUND OF THE INVENTION

There is a demand in the oil and gas industry to improve the hit rate of locating recoverable reserves, and for increasing the percentage of oil and gas recovered from reservoirs. This has resulted in the demand for improvements in the quality of seismic surveys and in a demand for in-reservoir fluid-imaging techniques. Both these requirements demand large numbers of sensors networked together.

Similar requirements in defense applications have been met using time-division multiplexing techniques, involving interrogating a number of hydrophone elements using a single pulse of light. The technique relies on the fact that for each hydrophone along the path part of the pulse energy will be modified by the hydrophone and reflected. This results in a series of reflected light pulses returning to a detector at different times from the separate hydrophone elements. The problem with this approach is that bandwidth is limited because of aliasing effects, which also restricts dynamic range. A further problem is that the number of elements addressable by a single source is relatively limited leading to a fairly large number of expensive electro-optic sources required in the total system.

A particular demand is for large arrays of optical hydrophones which can be interrogated simultaneously over single fiber leads, in real-time with high-dynamic range, and relatively wide bandwidth response. Such hydrophones are attractive for pumping through narrow bore conduits into oil reservoirs. Conventional coiled hydrophones are unsuited for this application because their diameter is not small enough. The hydrophone needs to have a diameter of no more than around 2 mm. The implication here is that the length of fiber which can be used in each hydrophone can be no longer than around 1 m to 10 m, which is significantly shorter than the 30 m to 300 m used in conventional optical fiber hydrophone systems which are coiled. These short lengths pose significant problems for the time-division multiplexing systems currently employed. In particular, the bandwidth of the resulting system is restricted owing to aliasing effects, and the pulse length (which when coherent light from a laser is used, conventionally corresponds to around the length of each coil) becomes excessively short making the electronic instrumentation difficult to implement.

Arrays exceeding 10,000 hydrophone elements can be envisaged in thin arrays which are extremely attractive for seismic streamers. These hydrophone elements would also need to be relatively short (around 1 m to 10 m).

Apparatus suitable for the simultaneous acquisition of high-bandwidth information in very long arrays was disclosed in a previous patent application GB2284256A. Wavelength division multiplexing was used in this apparatus such that hydrophone arrays could be interrogated with broadband light, and the information from each hydrophone returned at unique wavelengths. These wavelengths were separated and routed to different detectors. This apparatus has the drawback in that it utilizes a very large number of detectors—one per hydrophone element. Nevertheless, it is probably the only way to achieve very high bandwidth (500 kHz) interrogation of very short (1 m) hydrophones. The apparatus is probably not cost-effective for very large hydrophone arrays where the bandwidth requirement is relatively modest (100 Hz to 6 kHz).

Arrays using fiber Bragg grating pairs are particularly attractive—particularly if ways can be found to eliminate, or dramatically reduce, cross-talk between hydrophones. Such cross-talk is inherent in many architectures.

Conventional electrical seismic streamers contain hydrophones which are grouped together to reduce tow noise. Such groups are typically 12.5 m long and may contain 24 hydrophones. Optical hydrophone arrays can be constructed in a similar fashion, combining the outputs of groups of hydrophones in signal processing electronics. A more cost-effective solution is to replace each hydrophone group with a single hydrophone constructed in a linear fashion. However, this approach will not have the sensitivity of the coiled-hydrophone approach.

A problem with hydrophone arrays which has been published widely in the literature is that of polarization fading. Polarization fading is particularly problematic in linear hydrophones utilizing pairs of Bragg gratings. Many solutions to polarization fading have been published but none are truly satisfactory. The most robust solutions utilize either polarization maintaining optical fiber or polarizing optical fiber throughout the apparatus. However there are cost penalties associated with such solutions.

Similar polarization-fading problems exist in other sensing interferometers for the measurement of other parameters.

SUMMARY OF THE INVENTION

An aim of the present invention is to reduce polarization fading in interferometric sensing apparatus.

Accordingly in one non-limiting embodiment of the present invention, there is provided apparatus for interferometric sensing, which apparatus comprises a broadband optical source, a depolarizer for depolarizing optical radiation emitted by the broadband optical source, a matched interferometer, a sensing interferometer, and a detector, the matched interferometer being such that it contains a phase modulator and the apparatus being such that the optical path length difference in the sensing interferometer is approximately equal to the optical path length difference in the matched interferometer.

The broadband optical source may be a light emitting diode, or a superfluorescent fiber source, or a superluminescent diode.

The depolarizer may be a Lyott depolarizer, for example a Lyott depolarizer fabricated out of polarization maintaining optical fiber.

The phase modulator may be a frequency shifter.

In a first aspect of the invention, the sensing interferometer is a fiber optic sensing interferometer constructed using optical fiber Bragg gratings at either end of the fiber optic sensing interferometer. The optical fiber Bragg gratings at either end of the fiber-optic sensing interferometer may be chirped in opposite directions. As used herein, the term "chirped grating" refers to the fact that the periodicity in the refractive index perterbation increases along the length of the grating.

The sensing interferometer may be an optical fiber hydrophone which may be constructed from an optical fiber twisted around a compliant member and bonded. The apparatus may be such that there is a reduced number of separate hydrophones within each group of a seismic streamer may be achieved. Cross talk between hydrophones within the array may be dramatically reduced.

In a second aspect of the invention, the apparatus contains a plurality of sensing interferometers positioned along an optical fiber, and means for pulsing the optical radiation transmitted along the optical fiber such that the sensing interferometers positioned along an optical fiber, and each sensing interferometer reflects optical radiation at a substantially different wavelength.

The wavelength of the optical radiation from the broadband source may be scanned such that each sensing interferometer is interrogated separately.

The light returning from each sensing interferometer may be directed to a different detector by means of a wavelength division demultiplexer.

The optical radiation at the substantially different wavelengths may be derived from at least one optical source, and the optical radiation at each substantially different wavelength may be propagated through different matched interferometers prior to being propagated through the optical fiber containing the plurality of sensing interferometers.

The optical path length differences in each sensing interferometer may be different, and the optical path length differences in the sensing interferometer and the matched interferometer through which optical radiation having the same wavelength is propagated may be the same. The light returning from each sensing interferometer may be directed to a different detector by means of a wavelength division demultiplexer.

Each matched interferometer may contain a phase modulator with a unique identifying characteristic, the optical radiation from each sensing interferometer may be directed onto the same detector, and readout electronics may utilize the unique identifying characteristics of each phase modulator in order to demulitplex the signals from each sensing interferometer.

The apparatus may contain a plurality of depolarizers in order to depolarize the optical radiation before it propagates into each matched interferometer. Alternatively, the depolarizer may be positioned so as to depolarize the light before it propagates along the optical fiber cable containing the sensing interferometers.

The sensing interferometers may be optical fiber hydrophones which may utilize two Bragg gratings positioned at either end of a length of sensing optical fiber. The sensing optical fiber may contain a plurality of coils.

The apparatus may contain an optical circulator to direct optical radiation to the sensing interferometer and to direct light returning from the sensing interferometer to the detector.

The apparatus may include an optical isolator to isolate the broadband optical source from reflections.

The apparatus may include an optical amplifier to improve signal to noise ratio.

Embodiments of the invention will now be described solely by way of example and with reference to the accompanying drawings in which:

DETAILED DESCRIPTION OF PREFERRED EMBODIMENTS

Figure 1:
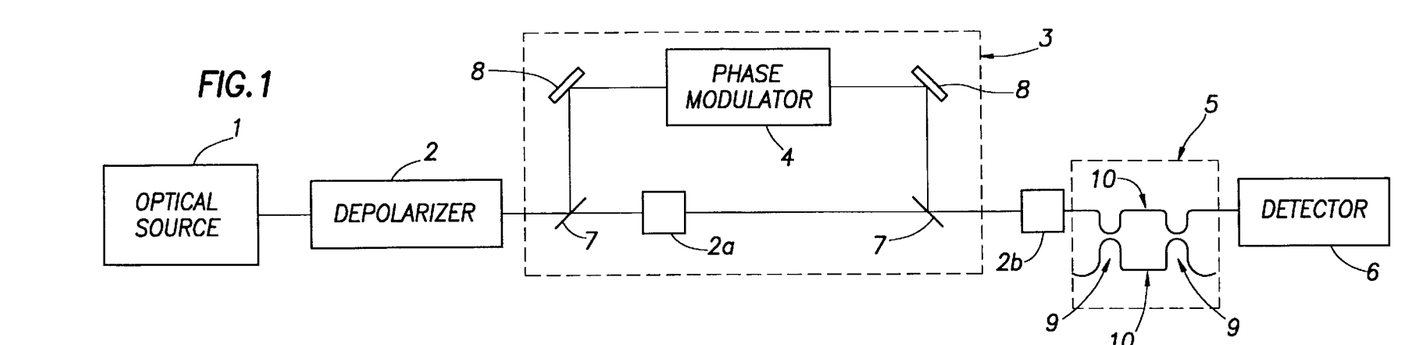
FIG. 1 shows interferometric sensing apparatus including a broadband optical source and a depolarizer.

With reference to FIG. 1, there is provided apparatus for interferometric sensing comprising a broadband optical source 1, a depolarizer 2 for depolarizing optical radiation emitted by the broadband optical source 1, a matched interferometer 3 containing a phase modulator 4, a sensing interferometer 5, and detector 6. The apparatus is such that the optical path length difference in the sensing interferometer 5 is approximately equal to the optical path length difference in the matched interferometer 3.

The matched interferometer 3 is shown in bulk optics form constructed from beam splitters 7 and mirrors 8.

The depolarizer 2 may be any convenient depolarizer such as a Lyott depolarizer. The depolarizer 2 may alternatively be replaced by a depolarizer 2*a* (which may be in either leg of the interferometer 3), or by a depolarizer 2*b*. For fiber-optic sensing applications, a Lyott depolarizer can be conveniently constructed using two lengths of highly-birefringent optical fiber spliced together at 45 degrees, one length having twice the retardation of the other length. It is important that the Lyott depolarizer depolarizes the light directed to the detector 6 from the sensing interferometer 5. This is particularly important in embodiments where the sensing interferometer 5 contains wavelength filters such as optical fiber Bragg gratings which return optical radiation having a longer coherence length than the optical radiation emitted by the broadband source 1.

The phase modulator 4 may be a frequency shifter such as an acousto-optic modulator or a fiber-optic frequency shifter. Alternatively, phase modulators constructed out of integrated optics or other electro-optic crystals can be used.

The sensing interferometer 5 is shown constructed using optical fiber couplers 9, and two lengths of optical fiber 10 with an optical path length difference equal to the optical path length difference in the matched interferometer 3.

Figures 2, 3, 4:
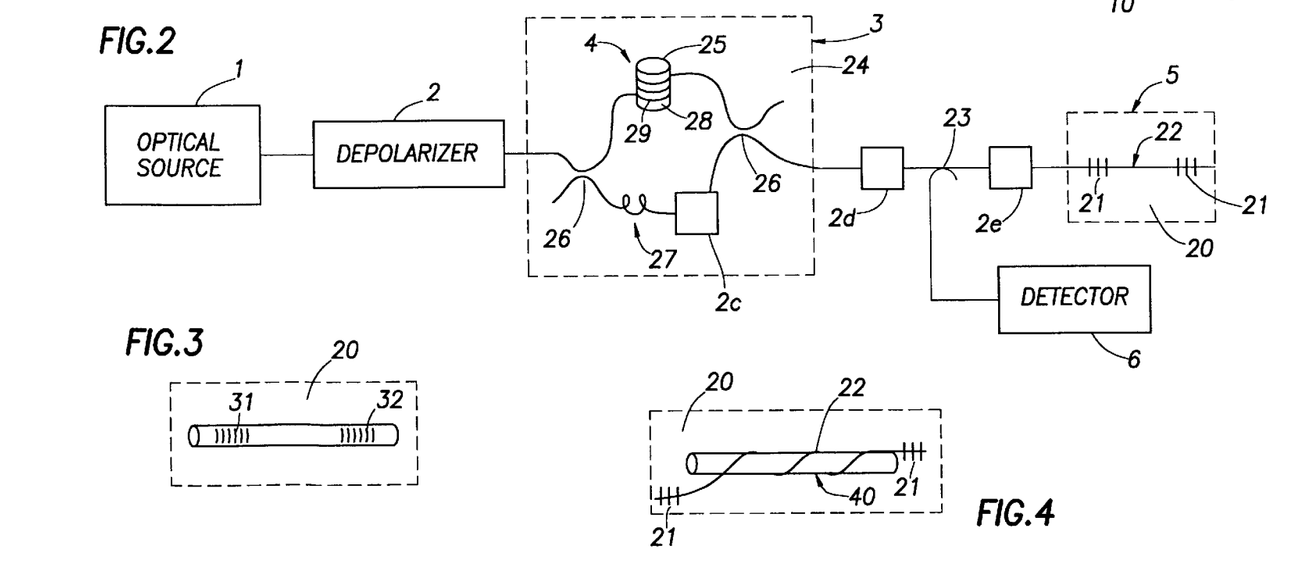
FIG. 2 shows interferometric sensing apparatus containing an optical fiber sensing interferometer.
FIG. 3 show an optical fiber sensing interferometer.
FIG. 4 shows a hydrophone element containing Bragg gratings.

FIG. 2 shows an alternative arrangement where the sensing interferometer 5 is an optical fiber sensing interferometer 20 constructed using optical fiber Bragg gratings 21 at either end of a length of optical fiber 22. The optical fiber Bragg gratings 21 form a reflective cavity between them. Reflected light is directed to the detector 6 using an optical fiber coupler 23. The matched interferometer 3 is implemented as an optical fiber matched interferometer 24 containing a phase modulator 25 and optical fiber couplers 26. It may be necessary in certain applications to include a polarization controller 27 within the optical fiber matched interferometer 24. However, it is preferable to use polarization maintaining optical fiber and polarization maintaining couplers in the matched interferometer 24 in order to control the polarization. The phase modulator 25 is shown constructed from wraps of an optical fiber 29 around a piezo-electric cylinder 28. The interferometer 5 defines a first optical path length difference and the interferometer 24 defines a second path length difference, where the first and second optical path length differences are approximately equal and the first optical path length difference is equal to twice the optical path length difference between the two optical fiber Bragg gratings and the second optical path length difference is equal to the path length difference between the two arms of the matched interferometer 24.

As in the embodiment of FIG. 1, the depolarizer 2 at the output of the optical source 1 may alternatively be replaced by a depolarizer 2c, or by a depolarizer 2d, or by a depolarizer 2e, so that the depolarizer may be located at alternative positions within the interferometric sensing apparatus, with the position specified by the depolarizer 2e as the best of the alternative positions. It is preferred to use polarization maintaining fiber in the matched interferometer and to launch light along one of the principle polarization axes of the polarization maintaining fiber in order to control polarization when the depolarizer 2e is used. The placement of the depolarizer 2e is preferred in each of FIGS. 5, 6, 7, 9, and 10, described below.

FIG. 3 shows an optical fiber sensing interferometer 20 formed by two optical fiber Bragg gratings 31 and 32 which are chirped in opposite directions. This may be advantageous to increase the sensitivity of optical fiber hydrophones.

FIG. 4 shows an optical fiber hydrophone where the optical fiber sensing interferometer 20 contains two optical fiber Bragg gratings 21 and where the optical fiber 22 is wrapped around a compliant member 40 and bonded. The compliant member 40 may be a polyurethane rod, or syntactic foam containing yarn (such as Kevlar) for strain relief, or other appropriate material.

Figure 5:
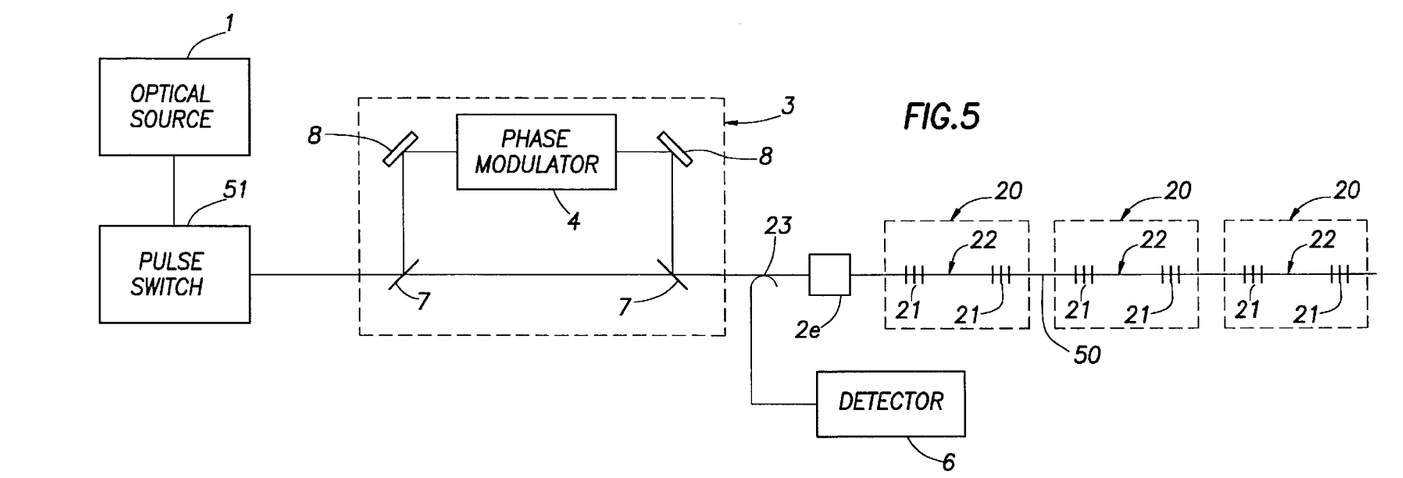
FIG. 5 show interferometric sensing apparatus utilizing time division multiplexing.

FIG. 5 shows several optical fiber sensing interferometers 20 placed at intervals along an optical fiber 50. These optical fiber sensing interferometers 20 can be interrogated in the time domain by pulsing the optical radiation from the broadband optical source 1 using means 51, shown in FIG. 5 as a pulse switch 51. The means 51 may be an acousto-optic modulator, and optical switch fabricated from electro-optic crystals, an integrated-optic optical switch, or any other optical switch. It is important in order to reduce cross-coupling in the light returning from the optical fiber sensing interferometers 20 to ensure that the pulses of optical radiation are sufficiently narrow to prevent overlapping of returned pulses from different optical fiber sensing interferometers 20 on the detector 6 in the time domain. The apparatus shown in FIG. 5 will suffer from cross-talk arising from multiple reflections between the optical fiber Bragg gratings 21 if all pairs are at the same wavelength.

Figure 6:
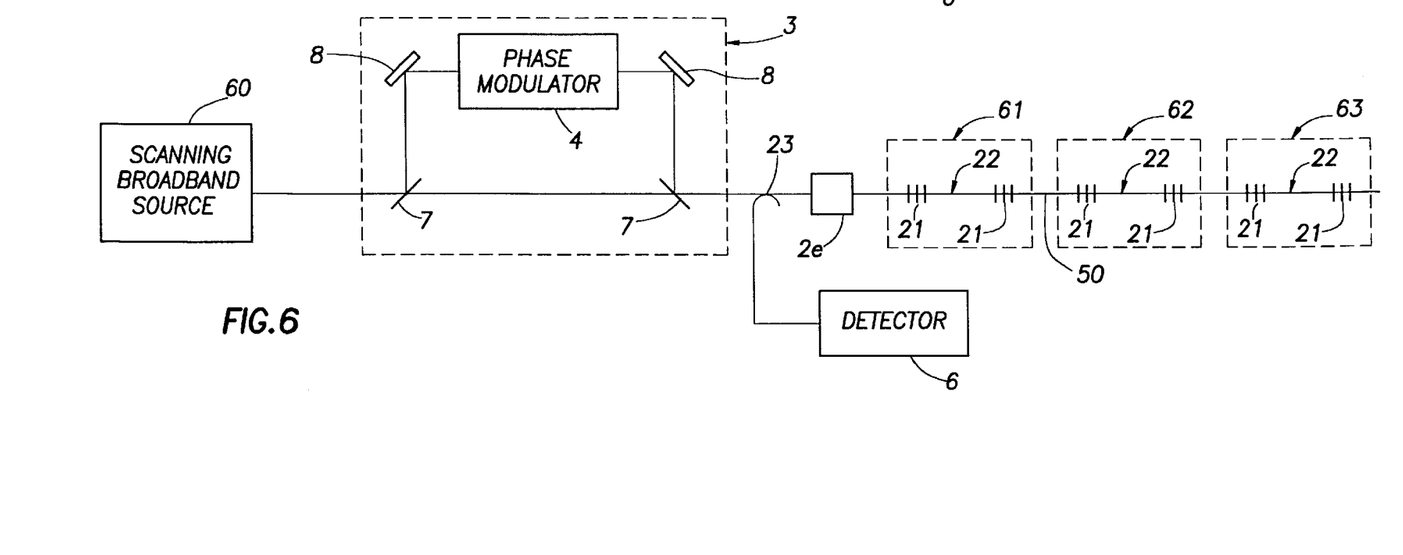
FIG. 6 shows interferometric sensing apparatus utilizing a wavelength swept source.

The optical fiber sensing interferometers 61, 62 and 63 shown in FIG. 6 return light at different wavelengths. The wavelength of the optical radiation from a scanning broadband source 60 is scanned such that each sensing interferometer is interrogated separately. In order to reduce cross-coupling, the scanning broadband source should have a spectral width sufficiently narrow so that two different optical fiber sensing interferometers are not illuminated at the same time. It is important that the Lyott depolarizer depolarizes the light reflected to the detector 6 from each optical fiber sensing interferometer 61, 62, and 63. This can be achieved with optical fiber by constructing the Lyott depolarizer with ten meters or more of highly-birefringent optical fiber.

Figure 7:
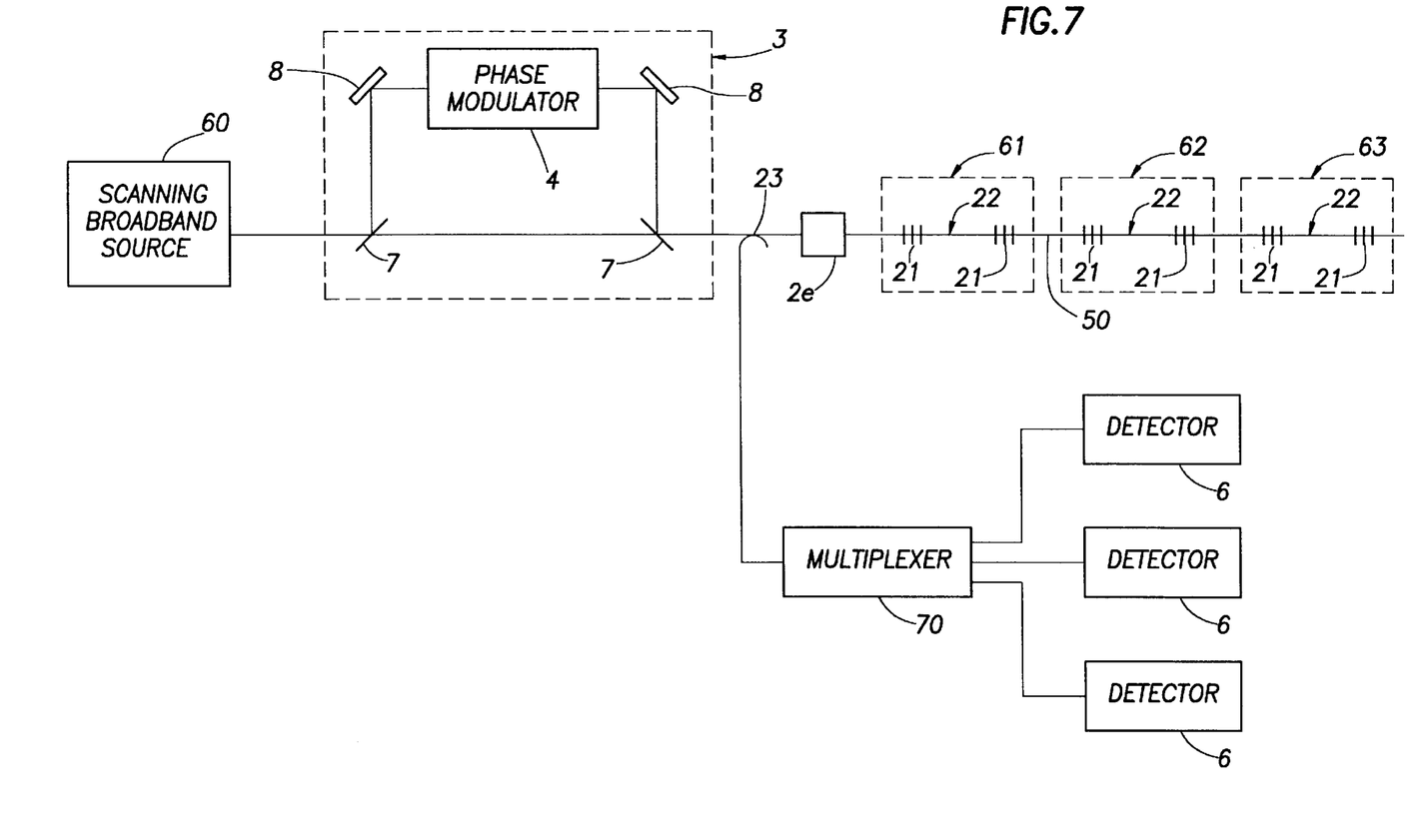
FIG. 7 shows interferometric sensing apparatus utilizing wavelength division multiplexing.

FIG. 7 shows the use of a wavelength division multiplexer 70 to direct the light returning from the different optical fiber sensing interferometers 61, 62 and 63 to different detectors 6. The wavelength division multiplexer 70 may be constructed with a blazed grating, or it may utilize optical fiber wavelength division multiplexers based on combinations of optical fiber Bragg gratings and optical circulators. The advantage of the arrangement shown in FIG. 7 is that it allows for simultaneous, high-bandwidth interrogation of the optical fiber sensing interferometers 61, 62, and 63.

Figures 8, 8A:
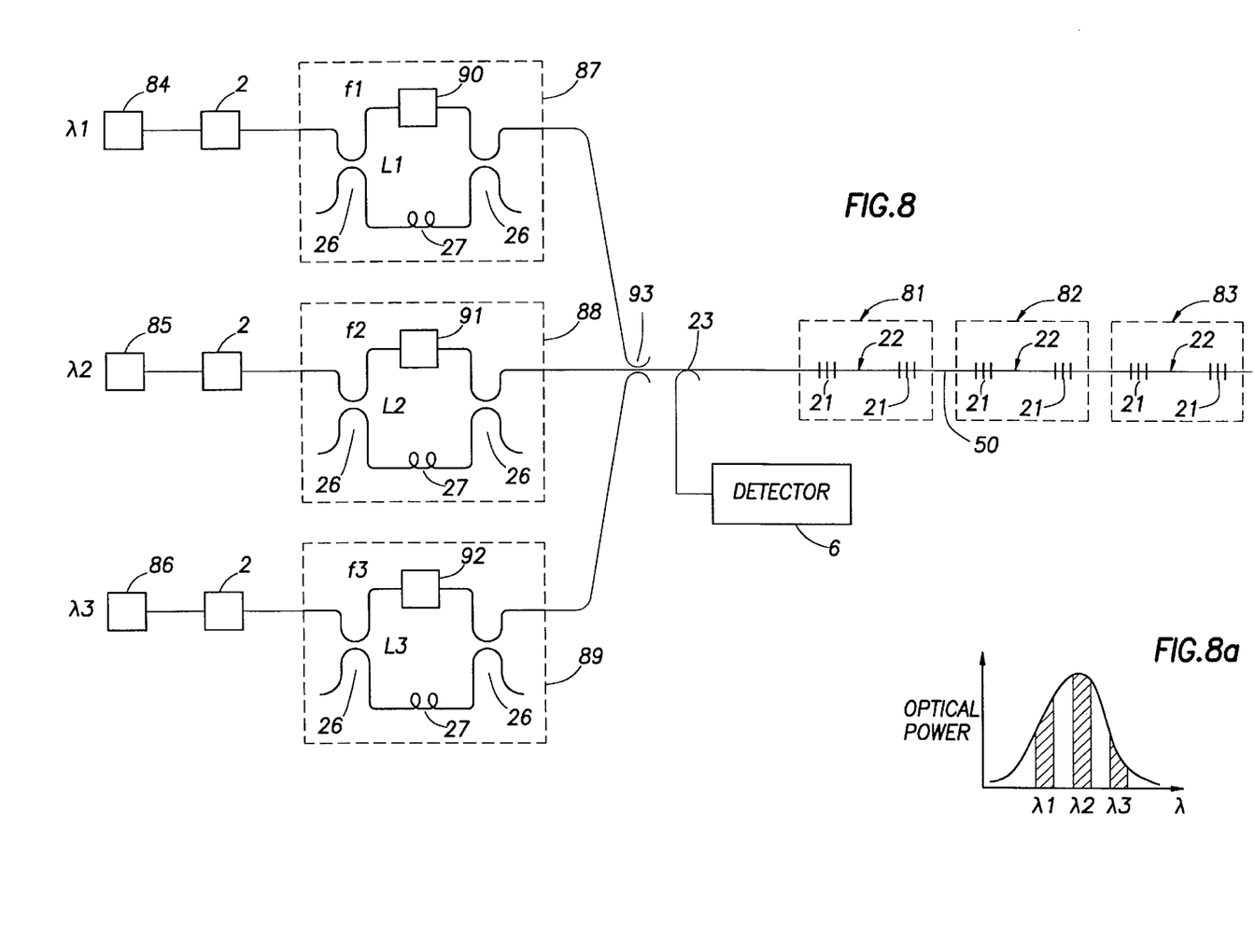
FIG. 8 shows interferometric sensing apparatus containing multiple sources.
FIG. 8*a* shows a representative distribution of optical power over the spectrum of wavelengths of interest.

FIG. 8 shows a preferred embodiment of the present invention where the optical fiber sensing interferometers 81, 82, and 83 have unique identifying optical path lengths and unique reflective wavelengths defined by the broadband reflective wavelengths of the optical fiber Bragg gratings 21. The wavelengths of the Bragg gratings within an interferometer are the same, while the wavelength of a Bragg grating in one interferometer is different than the wavelength of a Bragg grating in any other interferometer. The unique broadband optical radiation for each optical fiber sensing interferometers 81, 82, and 83 is derived from the broadband sources 84, 85, and 86, whose output radiation is depolarized by the depolarizers 2, before being coupled into matched interferometers 87, 88, and 89. The optical path length differences of the matched interferometers 87, 88, and 89 are matched to the respective optical fiber sensing interferometers 81, 82, and 83. The phase modulators 90, 91, and 92 each have a unique identifying modulation characteristic enabling the signals from the different optical fiber sensing interferometers 81, 82, and 83 to be demultiplexed electronically. Thus for example, if the phase modulators 90, 91, and 92 were frequency shifters having different frequency shifts, then the resulting signals can be separated by electronic filtering followed by synchronous phase demodulation. This process is similar to frequency tuning frequency modulated radio sets. Further, FIG. 8a shows a representative distribution of optical power over the spectrum of wavelengths of interest, with discrete bands $\lambda_1$, $\lambda_2$, and $\lambda_3$, which distribution also applies to FIGS. 9–11.

The advantages of this preferred embodiment are that the depolarizer 2 reduces polarization cross-talk between channels and reduces polarization fading. A further advantage is that cross-talk is reduced by utilizing wavelength division multiplexing, frequency division multiplexing and coherence multiplexing simultaneously. It should be noticed here that typical wavelength-division-multiplexing optical-fiber components do not provide perfect isolation outside their pass bands. Another advantage is that the multiplexing efficiency is high. Thus, for example, many more arrays can be added in parallel to the array shown by utilizing optical radiation from the spare output ports.

Figure 9:
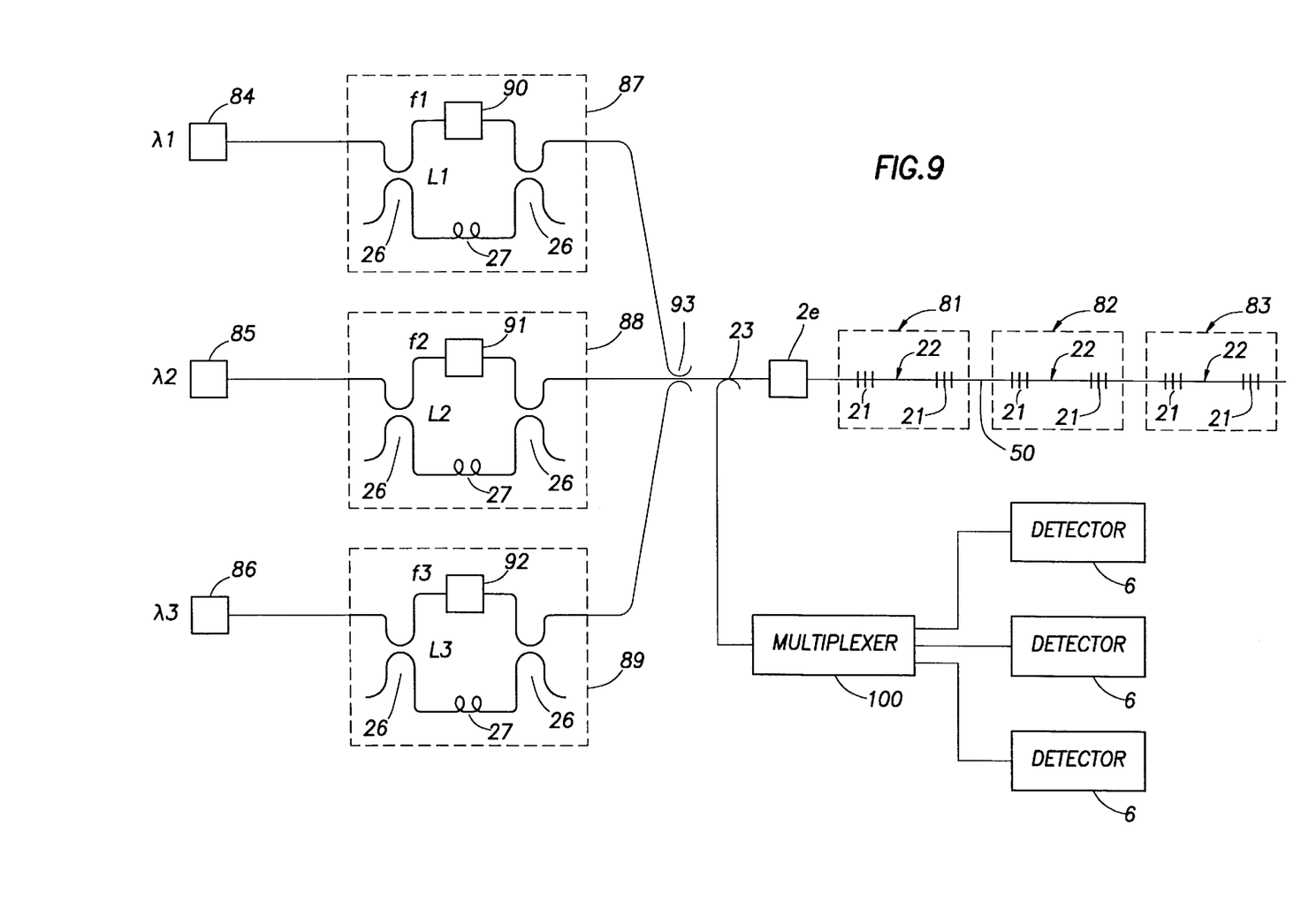
FIG. 9 show interferometric sensing apparatus containing multiple sources and using wavelength division multiplexing.

FIG. 9 shows the embodiment of FIG. 8 but with the use of a wavelength division multiplexer 100 at the output. This embodiment removes the need for electronic multiplexing of the channels thus enabling high-bandwidth, simultaneous interrogation of the optical fiber sensing interferometers 81, 82, and 83.

Although the embodiments shown in FIGS. 8 and 9 use multiple sources, it is possible to derive the optical radiation using a single broadband source and optical filters.

Figure 10:
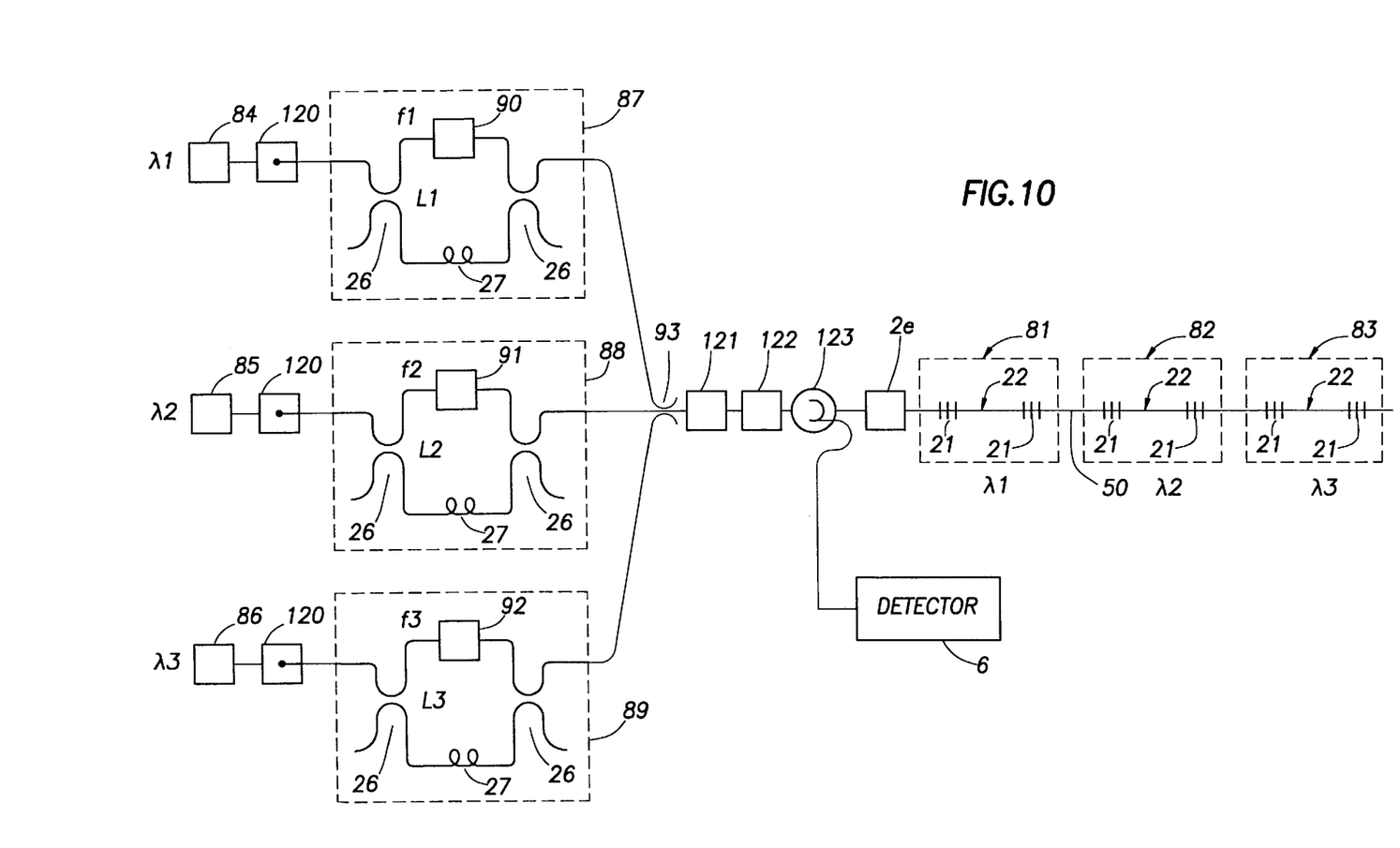
FIG. 10 show interferometric sensing apparatus containing an optical circulator and an optical amplifier.

FIG. 10 shows the embodiment of FIG. 8, but with isolators 120 to reduce reflections back into the broadband sources 84, 85, and 86, an optical fiber amplifier 121 to increase the light being directed to the cable 50, an additional depolarizer 122 to ensure that the light is properly depolarized, and an optical circulator 123 to direct the optical radiation along the cable 50, and to direct the optical radiation to the detector 6 from the cable 50. Alternatively, it is preferred that the depolarizer is in position 2e (as shown in FIG. 2), that the polarization maintaining fiber is used in the matched interferometer, that the polarized light is launched into the principle axes of the polarization maintaining fiber from the light sources, and that the depolarizer shown as item 2 is omitted.

Figure 11:
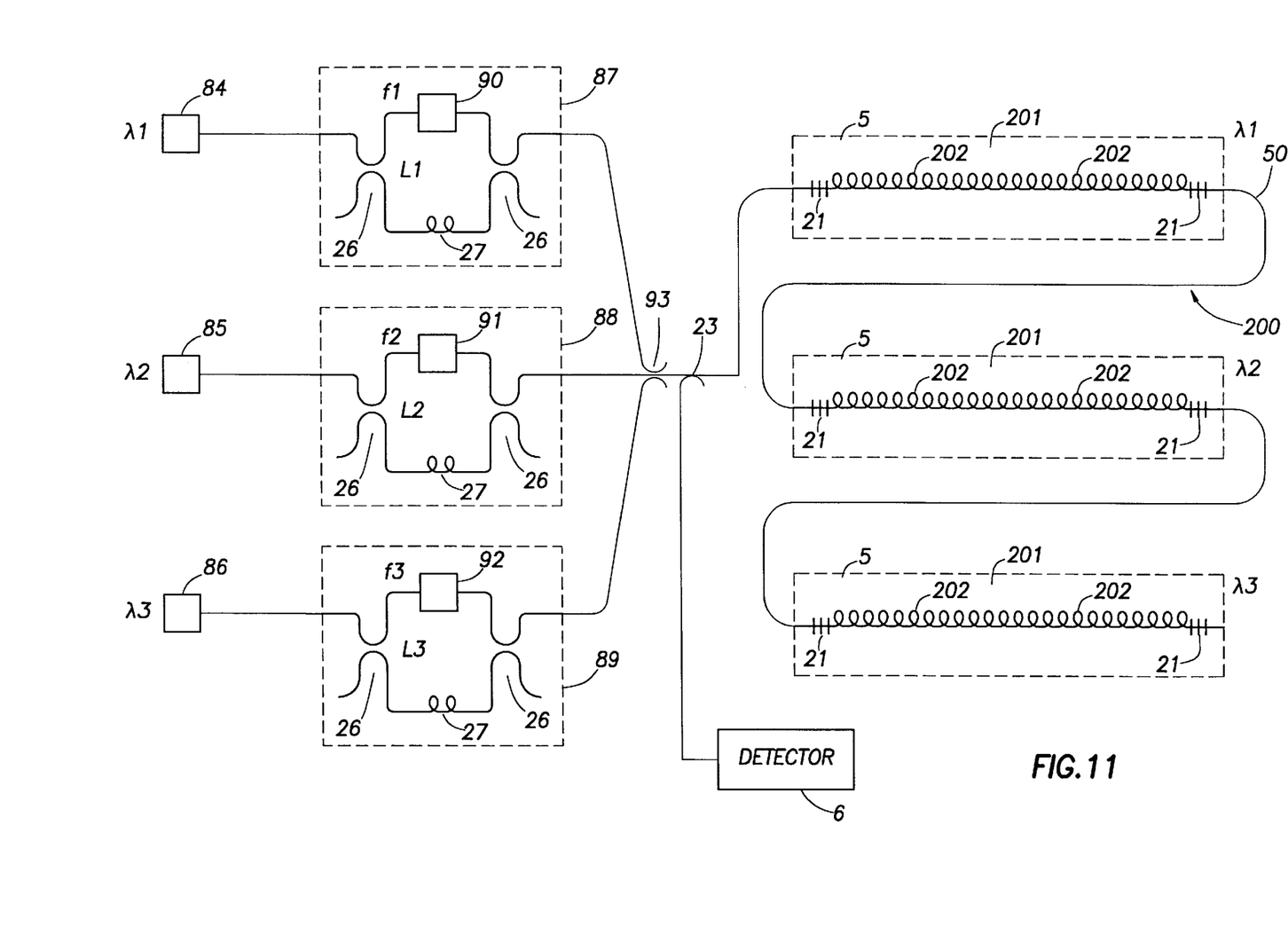
FIG. 11 show interferometric sensing apparatus being used in a seismic streamer.

FIG. 11 shows the preferred embodiment of FIG. 8 being used in a seismic streamer 200. Here the sensing interferometers 5 are hydrophones 201 constructed from a plurality of optical fiber coils 202 between the Bragg gratings 21. This embodiment is particularly attractive for hydrophone applications because of the reduction in the numbers of cables and electro-optic readout schemes required in the overall system. In seismic streamer applications, the streamer is towed along behind an ocean-going vessel. It is therefore unavoidable that the seismic streamer will be prone to bending disturbances—a process which can induce polarization noise into the system. The use of the depolarizer 2 and the broadband sources 84, 85, and 86 according to the present invention dramatically reduces such polarization noise and thereby allows the use of optical systems with excellent multiplexing efficiencies.

Thus, as applied to a seismic streamer, the present invention comprises a broadband optical source, such as 84, a detector 6, and an optical path between the source and the detector. Broadly speaking, the optical path contains a matched interferometer, which includes a phase modulator, in the optical path to receive optical radiation from the source and a plurality of sensing interferometers. Each sensing interferometer comprises a plurality of optical fiber hydrophones positioned along an optical fiber and the optical fiber has Bragg gratings at either end of the fiber. The sensing interferometers (each of which is a plurality of optical fiber hydrophones, such as 10 to 16 hydrophones, to reduce tow noise) are arranged to receive optical radiation from the matched interferometer. Finally, a first optical path length difference in the sensing interferometer is approximately equal to a second optical path length difference in the matched interferometer.

Various means may be included to enhance the sensitivity of the acoustics of the fiber, such as mechanical amplifiers and the like. Such mechanical amplifiers apply greater stress to the optical fibers in the presence of the same acoustic signal. On the other hand, the performance of the apparatus is improved if the apparatus minimizes the interferometer's sensitivity to the bending of the seismic cable as it moves through the water. This is accomplished by wrapping the optical fiber of the interferometer around a compliant member, such as a foam containing aramid yarn.

It is to be appreciated that the embodiments of the invention described above with reference to the accompanying drawings have been given by way of example only and that modification and additional components may be provided to enhance the performance of the apparatus.

We claim:

1. Apparatus for interferometric sensing comprising
   a. a broadband optical source;
   b. a detector; and
   c. an optical path between the source and the detector, the optical path including:
      i. a depolarizer in the path for depolarizing optical radiation emitted by the broadband optical source,
      ii. a matched interferometer in the path to receive optical radiation from the source, and
      iii. a sensing interferometer to receive optical radiation from the matched interferometer, the matched interferometer including a phase modulator, and wherein a first optical path length difference in the sensing interferometer is approximately equal to a second optical path length difference in the matched interferometer.

2. Apparatus according to claim 1 wherein the depolarizer is between the source and the matched interferometer.

3. Apparatus according to claim 1 wherein the depolarizer is a component part of the matched interferometer.

4. Apparatus according to claim 1 wherein the depolarizer is between the matched interferometer and the sensing interferometer.

5. Apparatus according to claim 1 in which the depolarizer is a Lyott depolarizer.

6. Apparatus according to claim 1 in which the phase modulator is a frequency shifter.

7. Apparatus according to claim 1 in which the sensing interferometer is a fiber optic sensing interferometer constructed using optical fiber Bragg gratings at either end of the fiber optic sensing interferometer.

8. Apparatus according to claim 7 in which the optical fiber Bragg gratings at either end of the fiber-optic sensing interferometer are chirped in opposite directions.

9. Apparatus according to claim 7 wherein the light signal to be sensed is directed to the detector using an optical fiber coupler.

10. Apparatus according to claim 9 wherein the depolarizer is between the matched interferometer and the optical fiber coupler.

11. Apparatus according to claim 9 wherein the depolarizer is between the sensing interferometer and the optical fiber coupler.

12. Apparatus according to claim 7 wherein the matched interferometer further includes a polarization controller.

13. Apparatus according to claim 12 wherein the depolarizer is between the polarization controller and the sensing interferometer.

14. Apparatus according to claim 1 in which the sensing interferometer is an optical fiber hydrophone.

15. Apparatus according to claim 14 in which the optical fiber hydrophone is constructed from an optical fiber twisted around a compliant member and bonded.

16. Apparatus according to claim 1 wherein the optical path comprises an optical fiber and wherein the sensing interferometer comprises a plurality of sensing interferometric elements positioned along the optical fiber, and in which the apparatus includes means for pulsing the optical radiation transmitted along the optical fiber such that the sensing interferometric elements are able to be interrogated using time division multiplexing.

17. Apparatus according to claim 1 wherein the sensing interferometer comprises a plurality of sensing interferometric elements positioned along an optical fiber, and in which each sensing interferometer reflects the optical radiation at a substantially different wavelength.

18. Apparatus according to claim 17 in which the wavelength of the optical radiation from the broadband optical source is varied such that each one of the sensing interferometric elements is interrogated separately.

19. Apparatus according to claim 17 in which there is a plurality of the detectors, and in which the light returning from each one of the sensing interferometric elements is directed to a different one of the detectors by means of a wavelength division demultiplexer.

20. Apparatus according to claim 17 in which there is a plurality of the matched interferometers, in which the optical radiation at the substantially different wavelengths are derived from at least one optical source, and in which the optical radiation at each substantially different wavelength is propagated through different ones of the matched interferometers prior to being propagated through the optical fiber containing the plurality of sensing interferometric elements.

21. Apparatus according to claim 20 in which the optical path length differences in each sensing interferometric elements are different, and in which the optical path length differences in the sensing interferometric elements and the matched interferometer through which optical radiation having the same wavelength is propagated are substantially the same.

22. Apparatus according to claim 20 in which the light returning from each sensing interferometric element is directed to a different detector by means of a wavelength division demultiplexer.

23. Apparatus according to claim 20 in which the phase modulator of each matched interferometer has a unique identifying characteristic, in which the optical radiation from each sensing interferometric element is directed onto the same detector, and in which the readout electronics utilize the unique identifying characteristic of each phase modulator in order to demultiplex the signals from each one of the sensing interferometric elements.

24. Apparatus according to claim 20 and containing a plurality of the depolarizers in order to depolarize the optical radiation before it propagates into each one of the matched interferometers.

25. Apparatus according to claim 16 in which the depolarizer is positioned so as to depolarize the light before it propagates along the optical fiber cable containing the sensing interferometric elements.

26. Apparatus according to claim 16 in which the sensing interferometric elements are optical fiber hydrophones.

27. Apparatus according to claim 26 in which the optical fiber hydrophones utilize two Bragg gratings positioned at either end of a length of sensing optical fiber.

28. Apparatus according to claim 27 in which the sensing optical fiber contains a plurality of coils.

29. Apparatus according to claim 1, further comprising an optical circulator to direct optical radiation to the sensing interferometer and to direct light returning from the sensing interferometer to the detector.

30. Apparatus according to claim 1, further comprising an optical isolator to isolate the broadband optical source from reflections.

31. Apparatus according to claim 1, further comprising an optical amplifier to improve signal to noise ratio.

32. Apparatus for a seismic streamer comprising
a. a broadband optical source;
b. a detector;
c. an optical path between the source and the detector, the optical path including:
  i. a matched interferometer in the path to receive optical radiation from the source, the matched interferometer including a phase modulator, and
  ii. a plurality of sensing interferometers each comprising a plurality of optical fiber hydrophones positioned along an optical fiber having Bragg gratings positioned at either end of the optical fiber, the sensing interferometers arranged to receive optical radiation from the matched interferometer, and wherein a first optical path length difference in the sensing interferometer is approximately equal to a second optical path length difference in the matched interferometer.

33. Apparatus according to claim 32 wherein the optical fiber hydrophones are constructed from coils of optical fiber.

34. Apparatus according to claim 32 wherein the optical fiber hydrophones include means for increasing the sensitivity of the optical fiber hydrophones to applied acoustic signals.

35. Apparatus according to claim 32 wherein the optical fiber is wrapped around a compliant member.

36. Apparatus according to claim 35 wherein the compliant member is foam containing aramid yarn.

* * * * *